July 28, 1953 W. M. SCHOLL 2,647,065
APPARATUS FOR AND METHOD OF MAKING ADHESIVE TAPE
Filed May 18, 1950
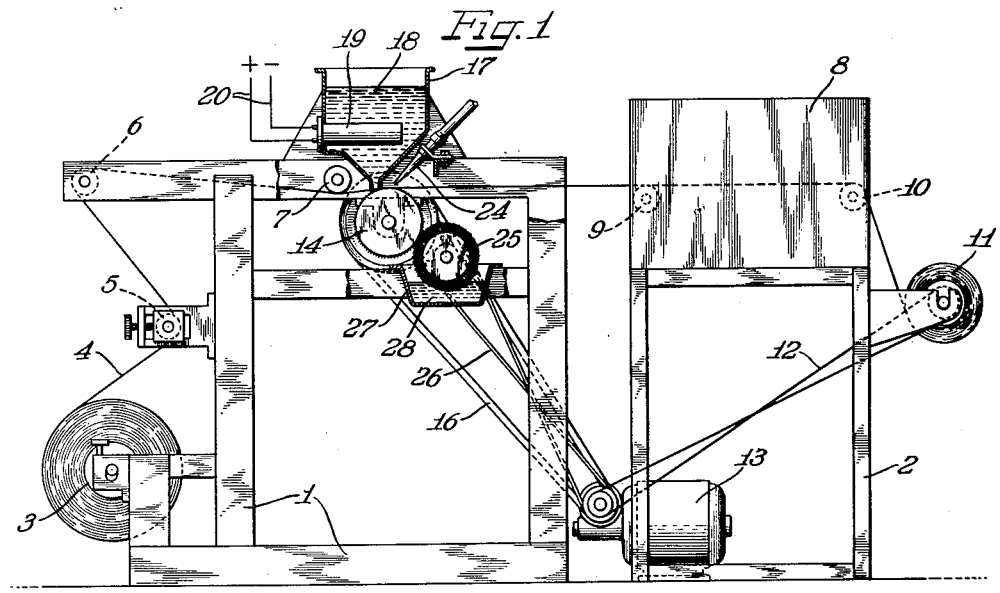
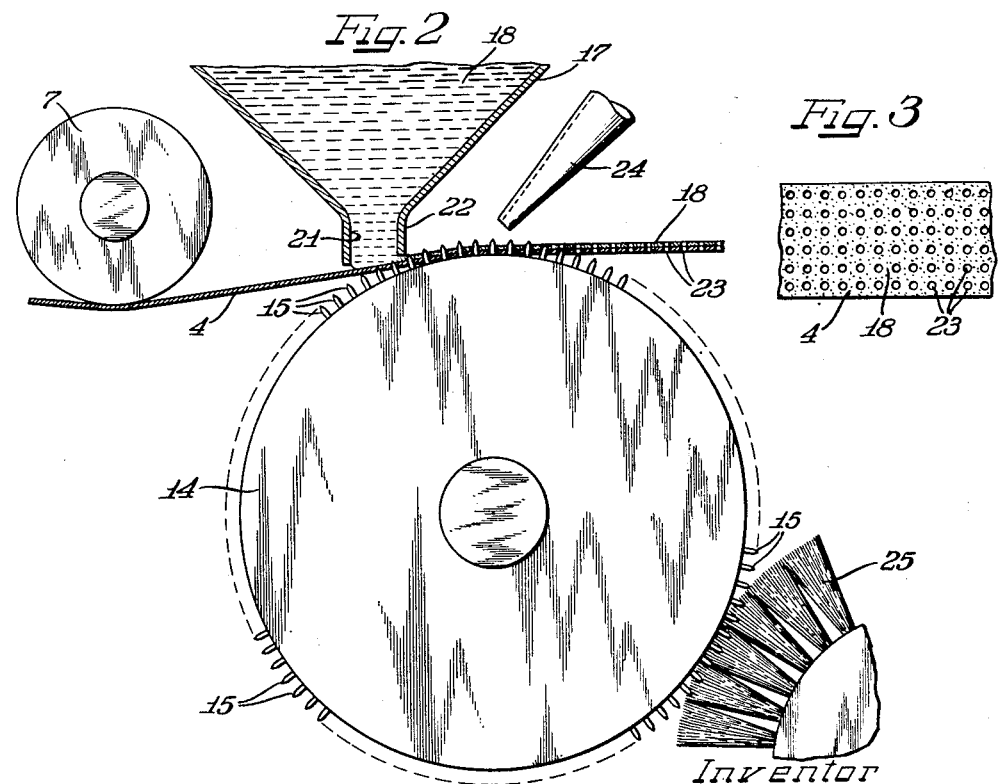
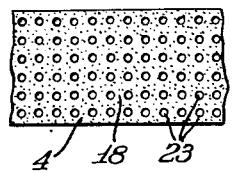
Inventor
William M. Scholl
by The Firm of Charles W. Hills
Attys Patented July 28, 1953

2,647,065

UNITED STATES PATENT OFFICE 2,647,065

APPARATUS FOR AND METHOD OF MAKING ADHESIVE TAPE

William M. Scholl, Chicago, Ill.

Application May 18, 1950, Serial No. 162,667

8 Claims. (Cl. 117—4)

1

This invention relates to improvements in apparatus for and a method of making adhesive tape, and more particularly to an adhesive tape so constructed as to provide adequate ventilation, thus making the tape highly desirable for application to the human body, although the tape will have other uses and purposes as will be apparent to one skilled in the art.

Medical and surgical adhesive tape of the type heretofore commonly used has proven highly irritative, especially to those having sensitive skin. This is due in the main to the fact that the tape is impervious to air, and there is no ventilation of the part of the skin covered by the tape. In some cases, irritation has been so severe that breaking of the skin occurred and infection resulted. Some efforts have been made to overcome this objection by providing a porous tape, wherein the adhesive itself was porous as well as the fabric backing of such adhesive mass. However, the provision of tape of that character requires a special adhesive and special treatment of it, so that optimum economy in manufacture might not be obtained in all cases.

With the foregoing in mind, it is an important object of this invention to provide apparatus for making an adhesive tape of porous character, wherein the porosity is uniform to a high degree, and with which substantially any type of adhesive mass may be utilized.

Another object of the invention is the provision of apparatus for the manufacture of porous adhesive tape, and wherein the tape as well as the adhesive spread carried thereby is provided with a myriad of relatively fine perforations.

A further feature of the invention resides in the provision of apparatus for the manufacture of porous adhesive tape, which apparatus embodies a perforating element carrying many needle points, or the equivalent, and positioned to act upon the tape shortly after the application of the adhesive spread thereto so as to perforate both the tape and the spread or mass.

Also a feature of the invention resides in the provision of apparatus for the manufacture of porous adhesive tape, wherein the tape backing as well as the adhesive mass is provided with a myriad of relatively fine perforations as the tape travels along a predetermined path, the apparatus embodying means to insure the setting of the adhesive mass sufficiently rapidly to prevent a flow thereof that would close off the perforations.

A further object of the invention resides in the provision of apparatus for the manufacture of porous adhesive tape, wherein a drum carrying

2 a myriad of needle points or the equivalent automatically perforates the tape and the adhesive mass, and means are provided to automatically cleanse the needle points after each penetration of the tape and mass.

It is also a feature of this invention to provide a new and novel method of making a porous adhesive tape, of the character highly desirable for medical or surgical use.

Still a further object of the invention resides in the provision of a new and novel form of adhesive tape embodying a tape backing, an adhesive mass spread over one side thereof, and the entire structure provided with a myriad of relatively fine perforations.

While some of the more salient features, characteristics and advantages of the instant invention have been above pointed out, others will become apparent from the following disclosures, taken in conjunction with the accompanying drawing, in which—

Figure 1 is a fragmentary part elevational part vertical sectional view of tape making apparatus embodying principles of the instant invention;

Figure 2 is a greatly enlarged fragmentary showing of the upper central portion of Fig. 1; and Figure 3 is a fragmentary face view of the resultant tape, looking at the adhesive covered side thereof.

As shown on the drawings:

In the illustrated embodiment of the instant invention there is shown a main frame 1, and an auxiliary frame 2. The particular structure of these two frames is not essential to the invention, since any form of frame structure combined or separated may equally as well be utilized. It will be understood that the frame consists of upright and cross pieces, preferably angle irons, connected together in any suitable fashion and disposed wherever deemed necessary to support the various moving parts of the machine, as is usual in frame construction.

Mounted on an offset portion of the main frame 1 is a suitable tape supply spool 3 mounted as an idler roll. This roll carries a stock or supply of tape backing 4 which may be of any suitable material such as a woven fabric, stretchable or non-stretchable, or any other material suitable for the production of plasters and adhesive tape, elastic or non-elastic. Usually for medical and surgical purposes, a woven fabric tape backing is preferred but in many cases a backing in the form of a thermoplastic or thermosetting plastic film may equally as well be utilized.

At a higher point on the main frame 1 an adjustable tape tensioning roll 5 is mounted, and along the top or bed of the frame under and over guide rolls 6 and 7 are provided, all these rolls being idlers.

On the auxiliary frame 2 a tunnel 8 is provided which may contain suitable drying equipment, if the same is deemed necessary. Inside this tunnel is another pair of guide rolls 9 and 10, which with the aforesaid rolls 6 and 7 define a predetermined path of travel for the tape backing 4 as it passes from the supply roll to an adhesive tape receiving roll 11 mounted on an offset portion of the subframe. This receiving roll 11 may be driven by way of a suitable belt 12 or the equivalent from any power element such as an electric motor 13.

Suitably journaled in bearing members carried by the main frame 1 is a rotary drum 14 disposed adjacent the path of travel of the tape backing 4. As seen best in Fig. 2, this drum is provided over its circumferential surface with numerous needle points 15 arranged in rows axially of the drum. These needle points are shown greatly exaggerated in Fig. 2, for purposes of clarity, it being understood that preferably the needle points are very fine in character so as to provide numerous relatively minute perforations. Obviously the size of the perforations is determined by the size of the needle points 15, and for larger widths of tape, larger openings may be desirable, but for the usual form and size of medical and surgical adhesive tape, it is deemed more desirable to provide a greater number of finer openings. The drum 14 may be driven from the same motor 13 by means of a belt 16 or the equivalent, but the drum obviously rotates in the opposite direction to the receiving spool 11. As viewed in Fig. 1, the drum 14 rotates clockwise, while the receiving spool rotates counterclockwise.

Above the bed of the main frame 1 a hopper 17 is mounted to contain an adhesive mass 18 for distribution on the tape 4. Depending upon the character of the mass, it may be desirable to keep the mass at an elevated temperature, and to this end a suitable form of electrical heating element 19 energized by way of a pair of conductors 20 may be associated with the hopper. An opening 21 is provided in the bottom of the hopper through which the adhesive may gravitate onto the tape 4 as it passes thereby, and it will be noted that on the trailing side of this discharge opening 21, the bottom of the hopper is turned down as indicated at 22 to function as a doctor blade and cause an even spread of the mass on the tape.

As seen best in Fig. 2, the drum 14 is disposed so as to definitely contact the underside of the tape 4 causing a slight elevation of the tape in its travel from the overhead guide wheel 7, and thus insuring a positive penetration of both the tape and applied adhesive spread by the needle points 15, these needle points providing numerous apertures 23 through both the tape and adhesive spread. Some compositions of adhesive mass may have a tendency to flow somewhat even after application to the tape, and would thus tend to close off the apertures through the mass, especially if those apertures were very fine. To overcome such difficulties with certain compositions of mass, a nozzle 24 is mounted so as to direct a blast of cold air against the adhesive mass contemporaneously with the perforation of the mass by the needle points, thus causing a sufficient setting of the mass to prevent a flow such as would close off the apertures 23.

Also, some compositions of adhesive mass may have a tendency to adhere slightly to the needle points 15 and thus a gradual accumulation of adhesive especially on the trailing sides of the needle points might interfere with the proper puncturing of the tape by these needle points. In order to overcome this difficulty, should it arise, a rotary brush 25 is mounted adjacent the drum and driven from the motor 13 by a belt or the equivalent 26 to rotate in a direction opposite to that of the drum. As seen in Fig. 1, adjacent the brush a vat 27 may be provided to contain a cleansing liquid 28, which is preferably a volatile oil in which the particular adhesive mass being used is soluble. It will be noted that the brush contacts the needle points shortly after the penetration of the tape, and will remove any adhesive mass adhering to these points in time for the points to become dry before next contacting the tape. The use of a volatile quick drying or evaporating oil is preferable so as to insure the underside of the tape 4 remaining in a clean and sanitary condition.

In operation, the instant invention is extremely simple. The tape is pulled along its predetermined path by the receiving roll 11, aided by the feeding action of the drum 14. The adhesive mass flows onto the upper surface of the tape, is smoothed by the doctor blade formation 22, and almost immediately both the tape and mass spread are perforated by the needle points 15 carried by the drum. Should the mass be of such a compound as to render it desirable, cold air may be discharged through the nozzle 24 to prevent a flow of the mass so as to close the apertures 23, and should the mass be of such character that some of it might adhere to the needle points, these are effectively and automatically cleansed by the rotary brush 25. As a result, a finished adhesive tape is wound upon the receiving roll 11, and as seen in Fig. 3, this tape is provided with numerous apertures therein so that when applied to the body adequate ventilation results. It will be especially noted that with the instant invention, substantially any compound of adhesive mass may be used, and any character of tape backing.

My novel method of manufacturing porous adhesive tape is believed sufficiently apparent from the foregoing as to warrant no further specific description herein.

It will be understood that modifications and variations may be effected without departing from the scope of the novel concepts of the present invention.

I claim as my invention:

1. The method of making adhesive tape, including the steps of moving a tape along a predetermined path, applying an adhesive mass to one face of said tape, perforating the tape and applied mass to provide numerous apertures therein, and contemporaneously forcing a cooling fluid over the mass.

2. The method of making adhesive tape, including the steps of moving a tape along a predetermined path, applying an adhesive mass to one face of said tape, successively providing transverse rows of perforations in the tape and applied mass, and forcing a chilling fluid over the mass contemporaneously with the forming of the perforations to prevent the mass from flowing so as to close the perforations after the perforating means are removed.

3. In adhesive tape making apparatus, a tape supply spool, an adhesive tape receiving spool, means defining a path for said tape between said spools, means to apply an adhesive mass on a face of the tape as it travels toward the receiving spool, a drum carrying numerous needles on the surface thereof contacting the other face of the tape with the needles perforating the tape and applied mass, and means to apply a cold fluid to the tape adjacent the region of perforation by said needles to chill the adhesive to prevent the same flowing together and closing the apertures upon withdrawal of the needles.

4. In adhesive tape making apparatus, a tape supply spool, an adhesive tape receiving spool, means defining a path for said tape between said spools, means to apply an adhesive mass on a face of the tape as it travels toward the receiving spool, a drum carrying numerous needles on the surface thereof contacting the other face of the tape with the needles perforating the tape and applied mass, a movable brush wiping said needles after their contact with the tape and mass, and means to supply a cleansing liquid to said brush.

5. In adhesive tape making apparatus, a tape supply spool, an adhesive tape receiving spool, means defining a path for said tape between said spools, means to apply an adhesive mass on a face of the tape as it travels toward the receiving spool, a drum carrying numerous needles on the surface thereof contacting the other face of the tape with the needles perforating the tape and applied mass, and cleansing means to bring a cleansing fluid into contact with said needles following their perforation of said tape and mass.

6. In adhesive tape making apparatus, means to move a tape along a path, means to apply adhesive to one face of said tape, perforating means operating to penetrate the tape and applied mass to provide numerous apertures therein, and fluid cooling means under pressure applied directly over the applied mass to chill said mass contemporaneously with the penetration thereof by said perforating means.

7. In adhesive tape making apparatus, means to move a tape along a path, means to apply adhesive to one face of said tape, a drum carrying numerous needles on its surface and rotating against the other face of said tape to cause said needles to perforate the tape and applied mass, a rotary brush to rotate oppositely to said drum and wipe said needles after their contact with the tape and mass, and a vat for cleansing liquid adjacent said brush to wet the brush.

8. In adhesive tape making apparatus, means to move a tape along a path, means to apply adhesive to one face of said tape, perforating means operating to penetrate the tape and applied mass to provide numerous apertures therein, and a nozzle positioned to direct a blast of cold air on the applied mass while the perforating means extend through the mass.

WILLIAM M. SCHOLL.

References Cited in the file of this patent

UNITED STATES PATENTS

| Number | Name | Date |
|---|---|---|
| 687,481 | Kammerer et al. | Nov. 26, 1901 |
| 1,229,284 | Kempel | June 12, 1917 |
| 1,981,561 | Lloyd | Nov. 20, 1934 |
| 2,055,002 | Chandler | Sept. 22, 1936 |
| 2,149,913 | Gilpin | Mar. 7, 1939 |
| 2,289,151 | Teague et al. | July 7, 1942 |
| 2,439,157 | Chavannes | Apr. 6, 1948 |